United States Patent
Griesmer et al.

(10) Patent No.: US 9,109,918 B2
(45) Date of Patent: Aug. 18, 2015

(54) METHOD AND SYSTEM FOR MANAGING DELIVERY OF CONTENT IN A NAVIGATIONAL ENVIRONMENT

(75) Inventors: Stephen Griesmer, Westfield, NJ (US); Arun Kandappan, Morganville, NJ (US); Neerav Mehta, Edison, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 1735 days.

(21) Appl. No.: 12/072,240

(22) Filed: Feb. 25, 2008

(65) Prior Publication Data
US 2009/0216433 A1  Aug. 27, 2009

(51) Int. Cl.
G06F 17/00 (2006.01)
G01C 21/36 (2006.01)

(52) U.S. Cl.
CPC ........ G01C 21/3655 (2013.01); G01C 21/3697 (2013.01)

(58) Field of Classification Search
USPC .......................................................... 701/208
See application file for complete search history.

(56) References Cited

U.S. PATENT DOCUMENTS

| | | | |
|---|---|---|---|
| 6,013,007 A * | 1/2000 | Root et al. | 482/8 |
| 6,353,785 B1 | 3/2002 | Shuman et al. | |
| 6,772,200 B1 | 8/2004 | Bakshi et al. | |
| 6,924,748 B2 | 8/2005 | Obradovich et al. | |
| 7,039,872 B1 | 5/2006 | Raheman | |
| 7,085,710 B1 | 8/2006 | Beckert et al. | |
| 7,107,063 B1 | 9/2006 | Bates et al. | |
| 7,162,451 B2 | 1/2007 | Berger et al. | |
| 2002/0016736 A1 * | 2/2002 | Cannon et al. | 705/14 |
| 2002/0065606 A1 * | 5/2002 | Kawai et al. | 701/211 |
| 2006/0046740 A1 * | 3/2006 | Johnson | 455/456.1 |
| 2007/0123237 A1 * | 5/2007 | Cacioppo et al. | 455/414.4 |
| 2009/0204320 A1 * | 8/2009 | Shaffer et al. | 701/202 |

* cited by examiner

Primary Examiner — Valerie Lubin
Assistant Examiner — Reginald R Reyes
(74) Attorney, Agent, or Firm — Scott P. Zimmerman, PLLC

(57) ABSTRACT

We have recognized a limitation that may arise when seeking to deliver both navigational and non-navigational content to a mobile user. The limitation is that the presentation of at least certain non-navigational content may interfere with presentation of the navigational content and vice versa. In accordance with an aspect of this invention, the above mentioned limitation is avoided by the following two steps. The first step is ascertaining an available window of time before a piece of navigational content needs to be presented to the mobile user. The second step is identifying a piece of non-navigational content which can be presented in its totality within the available window of time. Choosing non-navigational content which may be completely presented during an available window of time avoids the limitation noted above.

19 Claims, 9 Drawing Sheets

| EXAMPLES OF NON-NAVIGATIONAL CONTENT |
|---|
| TRAFFIC REPORT |
| WEATHER REPORT |
| AVAILABLE WINDOW OF TIME |
| NEWS STORIES |
| FINANCIAL NEWS |
| ADVERTISEMENT |
| PHONE CALL |
| MECHANICAL REPORTS |
| ENTERTAINMENT OPTIONS (E.G. MUSIC, VIDEO) |
| MISCELLANEOUS LOCALLY RELEVANT CONTENT |
| OTHER MISCELLANEOUS CONTENT |

FIG. 5

| | DATA TABLE PERTINENT TO PRESENTATION OF NON-NAVIGATIONAL CONTENT | | |
|---|---|---|---|
| | QUESTIONS | DEFAULT SETTING | CUSTOMIZED SETTING |
| GROUP 1 | DISPLAY NON-NAVIGATIONAL CONTENT DURING HIGHWAY TRAVEL? | YES | YES |
| | DISPLAY NON-NAVIGATIONAL CONTENT DURING LOCAL-ROAD TRAVEL? | NO | NO |
| GROUP 2 | DISTANCE BEFORE A NAVIGATIONAL ACTION WHEN A "NOTICE" REGARDING THE NAVIGATIONAL ACTION IS DISPLAYED? | 200 YARDS | 500 YARDS |
| | DISPLAY NON-NAVIGATIONAL CONTENT DURING "RELAXED TRAVEL"? | YES | YES |
| | DISPLAY NON-NAVIGATIONAL CONTENT DURING "ANXIOUS TRAVEL"? | NO | NO |
| GROUP 3 | TRAVEL SPEED TO BE USED IN DETERMINING AN AVAILABLE WINDOW OF TIME? | LEGAL SPEED LIMIT | ACTUAL TRAVEL SPEED |

FIG. 8

| DATA TABLE OF PRIORITIZED NON-NAVIGATIONAL CONTENT | | |
|---|---|---|
| ITEM | DEFAULT PRIORITY | USER SELECTED PRIORITY |
| TRAFFIC REPORT | 1 | 2 |
| WEATHER REPORT | 2 | 3 |
| AVAILABLE WINDOW OF TIME | 3 | 1 |
| NEWS STORY | 4 | 4 |
| FINANCIAL NEWS | 5 | 9 |
| ADVERTISEMENT | 6 | 5 |
| PHONE CALL | 7 | 6 |
| MECHANICAL REPORTS | 8 | 7 |
| ENTERTAINMENT OPTIONS (E.G. MUSIC, VIDEO) | 9 | 8 |
| MISCELLANEOUS LOCALLY RELEVANT CONTENT | 10 | 10 |
| OTHER MISCELLANEOUS CONTENT | 11 | 11 |

METHOD AND SYSTEM FOR MANAGING DELIVERY OF CONTENT IN A NAVIGATIONAL ENVIRONMENT

BACKGROUND OF THE INVENTION

The present invention relates generally to managing aural/visual delivery, and more particularly to managing aural/visual delivery in a navigational environment.

A primary function of a navigational device is to present navigational content, such as aural or visual-text directions and visual maps, in a timely manner to a mobile user. This navigational content may be transmitted to the mobile user through a service provider or the navigation device may have all of the navigational content already stored in the memory of the device. In the latter case, the navigational content may be updated by means of downloads or software packages.

Historically, there has been delineation between navigational devices and other devices. However, currently, this delineation between navigational devices and other devices has become fuzzy. Navigational devices, which historically have been solely designated to receive navigational content, are currently being expanded to include the ability to present non-navigational content. Additionally, other devices, not historically used to present navigational content—such as personal digital assistants (PDAs) or cell phones—are now able to receive navigational content. Therefore, a possibility exits where multiple types of content—both navigational and non-navigational—may be presented on the same device.

When a mobile user activates a device's navigational capabilities, it is likely that the mobile user is in a situation where receiving navigational information in a timely manner is critical. An example of such an environment is when a mobile user activates a device's navigational capabilities during an automobile trip.

The environment within an automobile, as well as other environments where a mobile user may desire to be presented with navigational content, is often full of various aural and visual presentation mediums. For example, while a mobile user is presented with navigational content, he may also be listening to a radio or talking on a cell phone. Additionally, as automobiles become more advanced, more aural and visual information will be presented to a mobile user by the automobile itself regarding certain urgent and non-urgent matters relating to its operation.

With so many different possible combinations for receiving both navigational and non-navigational content, there is a need to manage the presentation of the various contents.

SUMMARY OF THE INVENTION

We have recognized a problem that may arise when delivering navigational and non-navigational content—whether the presentation is on a single device or on multiple devices in a single presentational environment. This problem is that presentation of at least certain non-navigational content may interfere with presentation of the navigational content and vice versa. For example, the aural presentation of an extended news story may not be completed by the time that navigational content, such as the aural instruction "turn left 200 yards ahead," needs to be presented. It is certainly undesirable to allow the news story to continue and supplant the navigational content. But it is also undesirable—albeit less so—to interrupt the complete presentation of the news story in order to present the more urgent navigational content. The concurrent presentation of navigational and non-navigational content may not be a significant concern if the two types of content are in different presentational media, i.e. aural and visual. Thus if the mobile user has disabled the presentation of aural navigational content—choosing to rely only on visually presented map data and/or textual instructions—the concurrent aural presentation of a news story and the presentation of updated visual navigational content may not be problematic. Split-screen techniques might also allow both navigational and non-navigational content to be displayed on a screen concurrently. But the problem will certainly arise when both navigational and non-navigational content are to be presented aurally, as in the example presented above.

In accordance with an aspect of this invention, the above mentioned problems are solved by two steps. The first step is ascertaining an available window of time before a piece of navigational content needs to be presented to the mobile user. The second step is identifying a piece of non-navigational content which can be presented in its totality within the available window of time. Choosing non-navigational content which may be completely presented during an available window of time avoids the problem noted above. The first step is illustratively carried out as a function of (a) a current location and travel speed of a mobile user and (b) a projected location at which the piece of navigational content should be presented to the mobile user.

The term "navigational content" is used herein to refer either to (a) an aural presentation of the instruction, (b) a visual presentation of the instruction, or (c) a visual presentation of a map for illustrating the instruction.

The term "non-navigational content" is used herein to refer to all remaining content which is not classified as a piece of navigational content. Some examples of non-navigational content include: a weather report, a traffic report, an indication of the duration of an available window of time before navigational content will need to be presented, a news story, a phone call, an advertisement, an automobile's mechanical report, an entertainment option such as a piece of music or a video clip, miscellaneous locally relevant information, and other miscellaneous content.

In one embodiment, the step of identifying a piece of non-navigational content is performed by a service provider. Alternatively, this step is performed utilizing a device of a mobile user.

The identified piece of non-navigational content may be transmitted via a wireless channel from a server of a service provider to a mobile user's device. Alternatively, it may be already available in the mobile user's device.

In accordance with a feature of the invention, the step of identifying a piece of non-navigational involves selecting from at least two potential pieces of non-navigational content which can be presented during an available window of time. In one example of this feature of the invention, the service provider determines the prioritization of the non-navigational content. In a second example, the mobile user determines the prioritization of the non-navigational content. In a third example, the prioritization is based on a factory or merchant's default setting.

In accordance with another feature of the invention, an available window of time may be determined with a calculation. In another example, an available window of time is determined by looking an available window of time on a table, the table containing values pertaining to the mobile user's trip.

In accordance with another feature of the invention, in one embodiment, a presentation medium of the navigational content and non-navigational content is aural. In another embodiment, a presentation medium of both contents is visual.

These features and the various advantages of the invention can be more fully appreciated by reference to the following detailed description and the accompanying drawings.

BRIEF DESCRIPTION OF THE DRAWINGS

FIG. 5 is a data table pertinent to presentation of non-navigational content.

FIG. 8 is a data table of prioritized non-navigational content.

DETAILED DESCRIPTION

When a mobile user activates a device's navigational capabilities, the likelihood is that the mobile user is in a situation where receiving navigational information in a timely manner is critical. An example of such an environment is when a mobile user receives navigational content during an automobile trip.

Figures 1, 2:
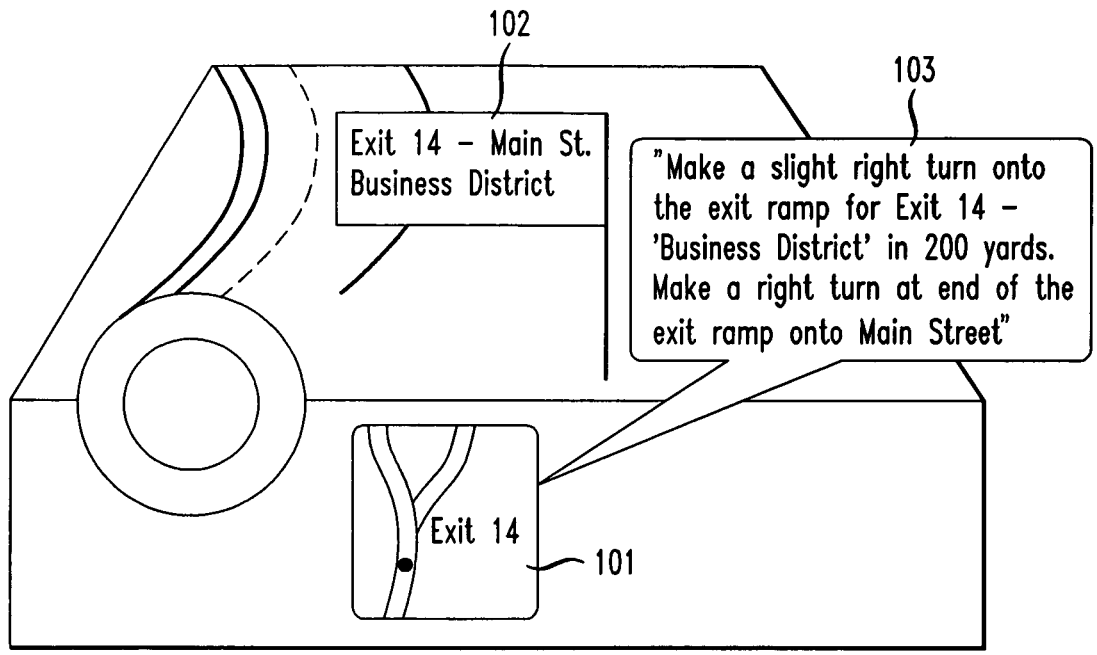
FIG. 1 illustrates a device—mounted on an automobile dashboard—able to present navigational content.
FIG. 2 is a table showing various types of non-navigational content.

FIG. 1 illustrates a device 101—mounted on a dashboard—able to present navigational content. Out of the automobile's window can be seen a road sign 102 for "Exit 14—Main Street, Business District". The navigational device issues an aural direction 103 "Make a slight right turn onto the exit ramp for Exit 14—'Business District' in 200 yards. Make a right turn at end of the exit ramp onto Main Street." The navigational device also presents a visual map. An alternative visual display may be a visual listing of the trip's navigational actions. Other visual options may be envisioned.

Automobiles—as well as other environments where a mobile user may desire to receive navigational content—are often full of various devices on which all sorts of aural and visual content may be presented. Some examples of these devices include: a navigational device which is able to receive non-navigational content, a cell phone, a PDA, a car stereo, and a processor connected to the car which may issue audio or visual alerts such as informing the driver concerning the car's operational status. Other examples of such devices may be envisioned.

Some examples of non-navigational content are listed in the table of FIG. 2. Non-navigational content may include: a weather report; a traffic report; an indication of the duration of an available window of time before navigational content will need to be presented, which is useful—for example—in deciding whether to place or receive a phone call at a particular time during a trip; a news story; a phone call; an advertisement; an automobile's mechanical report; an entertainment option such as a piece of music or a video clip; miscellaneous locally relevant information, such as emergency reports or local tourist attractions; and other miscellaneous content.

Figure 3:
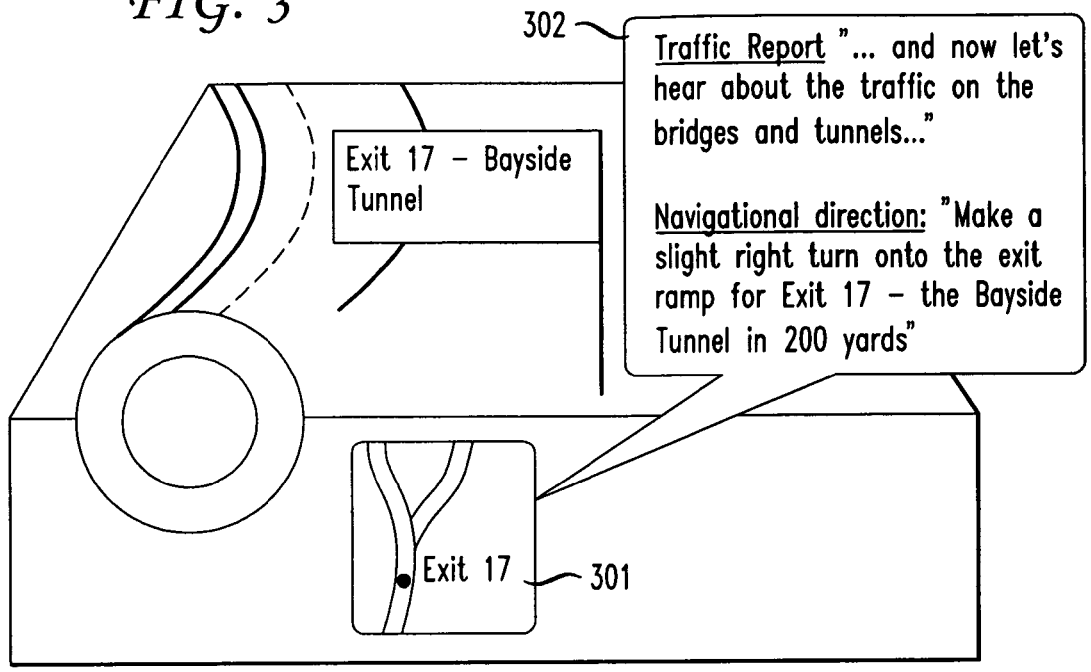
FIG. 3 illustrates a device—presenting non-navigational content—being interrupted to present navigational content.

We have recognized a problem that may arise when delivering navigational and non-navigational content, whether the presentation is on a single device or on multiple devices in a single presentational environment. This problem is that presentation of at least certain non-navigational content may interfere with presentation of the navigational content and vice versa. An example of how this problem may arise on a single device is illustrated in FIG. 3. In this figure, a traffic report presented on a device 301 is providing information about the traffic on the local "bridges and tunnels". The information concerning the traffic report is interrupted with the navigational content 302 directing the driver, "Make a right turn at end of the exit ramp." An alternative mode of presentation is for the traffic report to continue despite the mobile user's need for the navigational information. Either alternative may be frustrating to the mobile user, who desires to know both the traffic on the Bayside Tunnel as well as the instruction regarding when to turn onto the Bayside Tunnel.

A problem can also arise when the navigational and non-navigational content are presented in the same environment. Even though the multiple contents are not presented on the same device, the multiple presentations of content may still distract a mobile user from being able to focus on either content. For example, the non-navigational information may be an aural traffic report playing on the car stereo while the navigational information may be an aural direction being presented on a navigational device. There is no problem to mechanically play both pieces of aural content simultaneously. However, the mobile user will likely find it difficult to effectively listen to both pieces of information at the same time.

Figure 4:
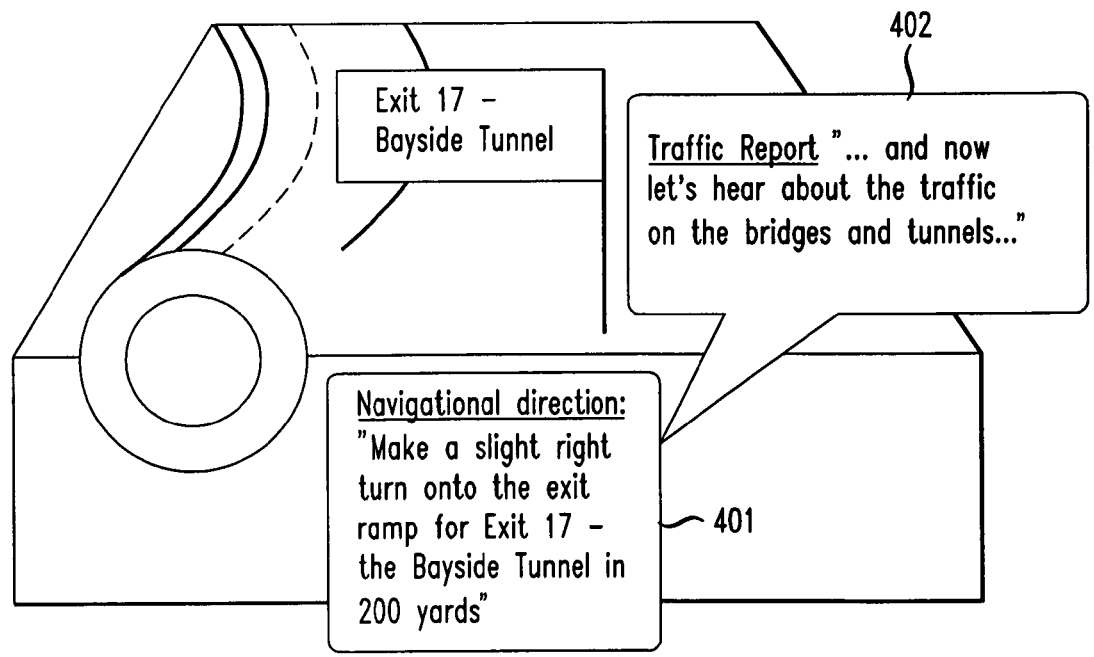
FIG. 4 illustrates a device presenting non-navigational content aurally and navigational content visually.

The concurrent presentation of navigational and non-navigational content may not be a significant concern if the two types of content are in different presentational media, as is shown in FIG. 4. In this example, the mobile user has disabled the presentation of aural navigational instructions—choosing to rely only on visually presented textual instructions 401. Therefore, the concurrent aural presentation of a traffic report 402 and visual presentation of textual navigational content may not be problematic. Split-screen techniques might also allow both navigational and non-navigational information to be displayed on a screen concurrently. But, as mentioned previously concerning the example in FIG. 3, the problem will certainly arise when both navigational and non-navigational content are to be presented in the same presentational medium.

In accordance with an aspect of this invention, the above mentioned problems are solved by two steps. The first step is ascertaining an available window of time before the piece of navigational content needs to be presented to the mobile user. The second step is identifying a piece of non-navigational content which can be presented in its totality within the available window of time. Choosing non-navigational content which may be completely presented during an available window of time avoids the problems noted above.

Before discussion this solution in further detail, some additional background material will be useful.

FIG. 5 is a data table pertinent to a presentation of non-navigational content. The data table indicates a mobile user's decisions along side of factory settings. The mobile user's decisions may have been obtained using a graphical user interface (GUI). A GUI may be presented to a mobile user before each trip. Alternatively, the GUI may be presented to the mobile user during registration with a service provider to receive non-navigational content.

Questions and settings that are shown in Group 1 allow the mobile user to specify in which types of locations non-navigational content may be displayed to the mobile user. The designation of highway travel and local-road travel, in one embodiment, depend on the road's speed limit. In a different embodiment, these designations depend on the presence or absence of stop lights. In another embodiment, these designations depend on the number of lanes in the road. Other embodiments may be envisioned.

Questions and settings in Group 2 are used for ascertaining in which scenarios non-navigational content may be provided to a mobile user. In one embodiment, when a mobile user begins using a navigational device for a particular trip, the mobile user enters a destination location. The navigational device determines the current location of the mobile user. This determination may either be from mobile user input or through a locating means in the proximity to the mobile user. In one example, the locating means are a global positioning system (GPS).

The default input values for all the groups may be set by a manufacturer or a service provider at the time of the initiation of the service. The customized settings may be determined by a mobile user, a service provider, or a third party.

In group two, it is determined how much advance notice will be given to a mobile user before an upcoming navigational action. Additionally, it is determined in this grouping if non-navigational action may be displayed during; (1) "relaxed travel", which is travel between a completed, prior navigational action and a notice of an upcoming navigational action; and, (2) "anxious travel", which is travel between a notice of an upcoming navigational action and the location for performing the navigational action.

The question and setting in group 3 is used in determining which travel speed will be used in determining an available window of time. Some possible options for travel speed include; legal speed limit or limits for each stretch of travel, actual travel speed of the vehicle of the mobile user which may include periodic updates, and some offset value from either of these two values—such as 5 miles per hour (mph) above the legal speed limit. Values for the legal speed limit may be determined from a map stored in the device or a server. Actual travel speed values may be determined by a GPS. The GPS can make a time stamp at two different locations during travel. By dividing the distance traveled by the time difference between the two time stamps, the resulting value gives the speed of travel.

Certain values in the data table have an affect on the determination the available window of time. First, it is determined if the mobile user desires to receive any non-navigational content in various scenarios. These scenarios include: highway travel, local-road travel; and, relaxed travel and anxious travel. Second, in a scenario where non-navigational content may be provided, other values in the data table are used to determine the available window of time for presenting this content. One example is the value for a distance before a navigational action when a "notice" of an upcoming navigational action is displayed. This value indicates that an early warning is being provided to the mobile user. Instead of receiving navigational content immediately before a needed action, this feature gives the mobile user a certain fixed time or travel distance to prepare for the upcoming navigational action.

Additionally, the travel speed obtained from the data table is used to determine an available window of time. In one example where the available window of time is determined from a calculation, the travel speed is needed to determine how much time the traveler will take to get from a starting point to a point where navigational will be presented. In another example, where the available window of time is determined from looking up a value on a table, a travel speed may be one of the inputs necessary to determine the value.

Figure 6:
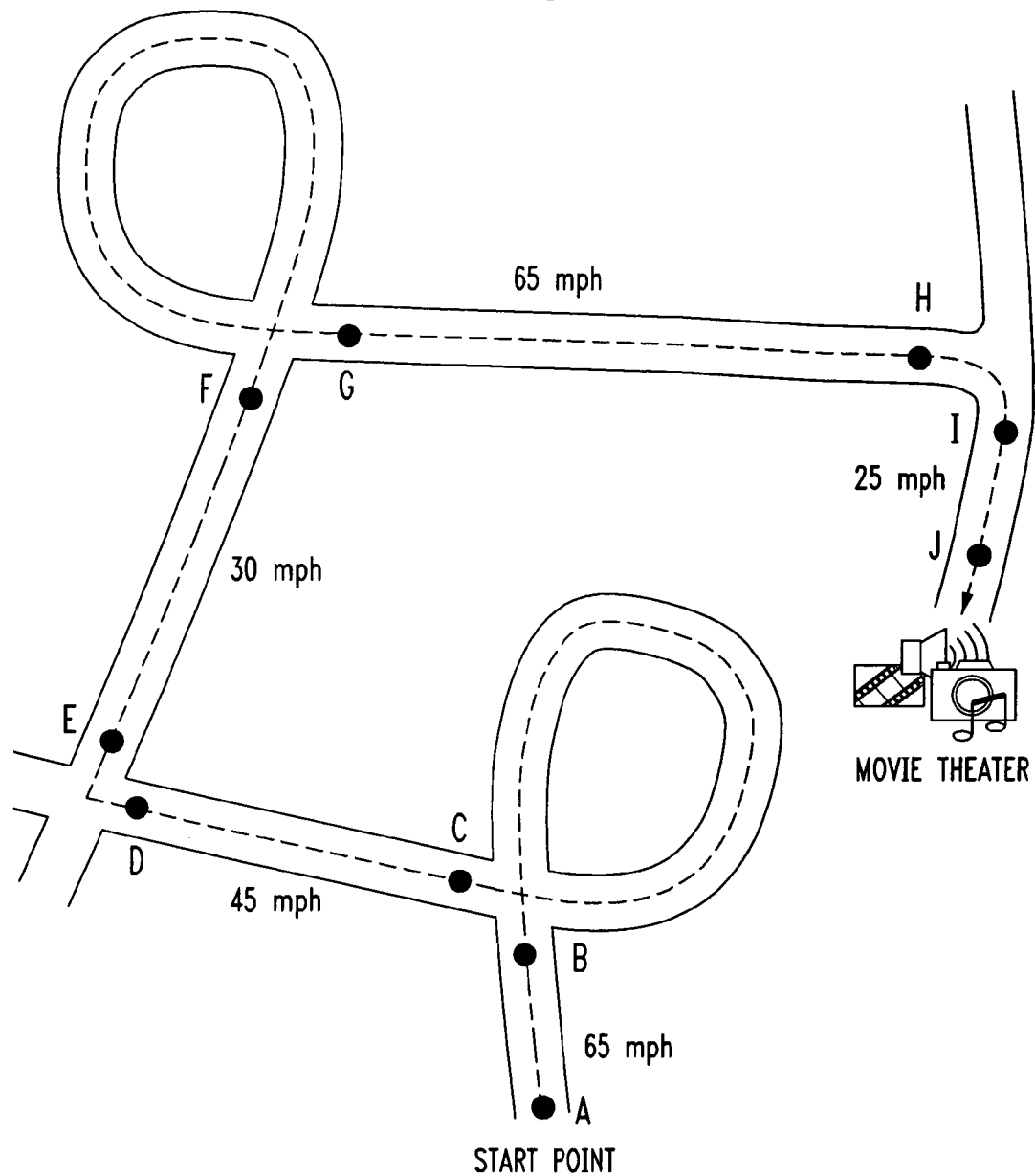
FIG. 6 is a diagram illustrating notices of upcoming navigational actions and locations of completed navigational actions for a typical trip.

FIG. 6 is a diagram illustrating (a) the positions of a vehicle at which notices of upcoming navigational actions are given during a typical trip and (b) locations of completed navigational actions. A mobile user starts a trip at point A traveling on a road with a speed limit of 65 mph. If the legal speed limit was chosen in FIG. 5 as the travel speed to use, then 65 mph would be used here. Additionally, the determination in FIG. 5 regarding whether a mobile user wants to receive non-navigational content during highway travel will impact on where the mobile user may receive the content during this phase of travel. Even if the mobile user selects "yes" or the default value is "yes", it must still be determined if there is a sufficient window of time for presenting the non-navigational content.

The first notice of an upcoming navigational action is at point B which is a certain distance before the initial road ends and turns into a 45 mph road. At point C, the mobile user has completed the navigational action and entered the 45 mph road. Between points B and C is what is referred to as "anxious travel", since the traveler is anticipating having to perform an upcoming navigational action responsive to the notice that was delivered at point B. The next notice of a navigational action is at point D, where the mobile user is instructed to make a right turn onto a 30 mph road. Between points C and D is what is referred to as "relaxed travel", since the traveler has not received any instructions for upcoming, imminent navigational actions. However, since travel between points C and D may be considered "local travel", this option on FIG. 5 must have been set to "yes" in order to potentially receive non-navigational content. Additionally, there must still be a sufficient window of time available before the navigational content is needed.

At point E, the mobile user has completed the navigational action and entered the 30 mph road. The next notice of a navigational action is at point F, where the mobile user is instructed to enter an entrance ramp for a 65 mph road. At point G, the mobile user has completed the navigational action and has merged onto the 65 mph road. The next notice of a navigational action is at point H, where the mobile user is instructed to turn right on a 25 mph road at the end of the previous road. At point 1, the mobile user has completed the navigational action and has entered the 25 mph road. At point J, the mobile user receives the last notice of a navigational action where the mobile user is instructed to turn into a movie theater's parking lot.

Figure 7:
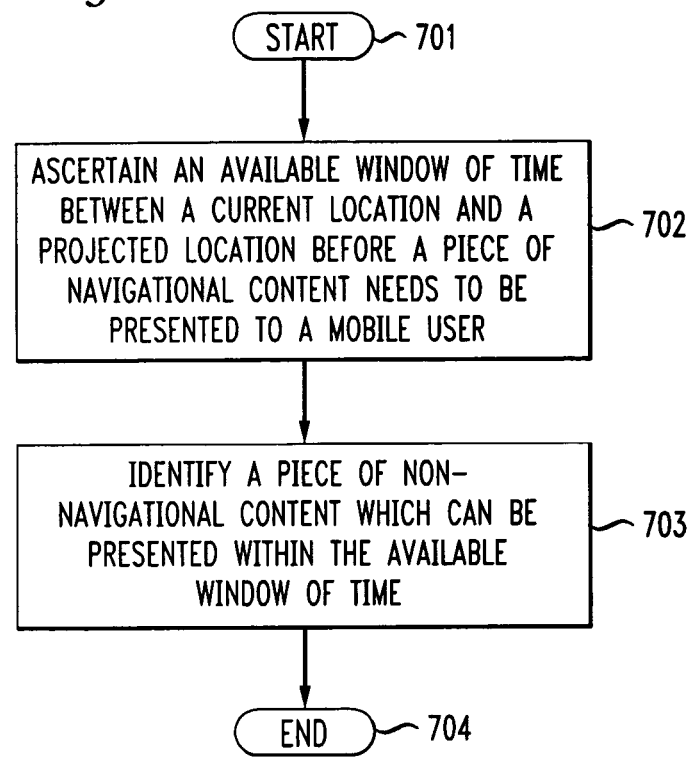
FIG. 7 is a flowchart illustrating an aspect of the principles of the invention.

The flowchart of FIG. 7 illustrates an aspect of the principles of the invention. The process begins at step 701. Step 702 involves ascertaining an available window of time between a current location and a next navigational action point. In one example, a window of time is calculated based on the distance between the current location of the mobile user, a next navigational action point, and the speed of travel of the mobile user. A next navigational action point is a projected location where a mobile user receives navigational content. The navigational content may be received immediately before the necessary action needs to be performed, or it may be received some time or distance in advance of when the necessary action needs to be performed.

Step 703 involves identifying a piece of non-navigational content which can be presented within the available window of time. This step may be performed by a server managed by a service provider. Alternatively, this step may be performed by a mobile user's device.

When the step of identifying is performed by a server, the non-navigational content may be transmitted to a mobile user's device and stored for a later presentation. Alternatively, the non-navigational content may be transmitted and then presented immediately. In either case, the transmission from the server to the mobile user's device may take place via a wireless transmission, such as over a cellular network.

When the step of identifying is performed by a mobile user's device, the non-navigational content may be provided to the device from a server or from various other sources. Once the mobile user's device has identified the non-navigational content, the content may be presented immediately. Alternatively, the non-navigational content may be presented at a later time.

When multiple pieces of non-navigational content may be presented within a window of time, the step of identifying further involves selecting a piece of non-navigational content with a highest prioritization. A prioritization may be established as a factory setting or by a service provider. Alternatively, a prioritization may be established by a mobile user.

FIG. 8 is a data table of prioritized non-navigational content. A default priority setting is shown along side of user selected values. The default priority setting may be a factory setting or a setting made by a service provider. The user selected values may be obtained from presenting a mobile user with a graphical user interface (GUI) at the onset of a trip. Alternatively, a GUI may be presented to the mobile user during a registration period.

Figure 9:
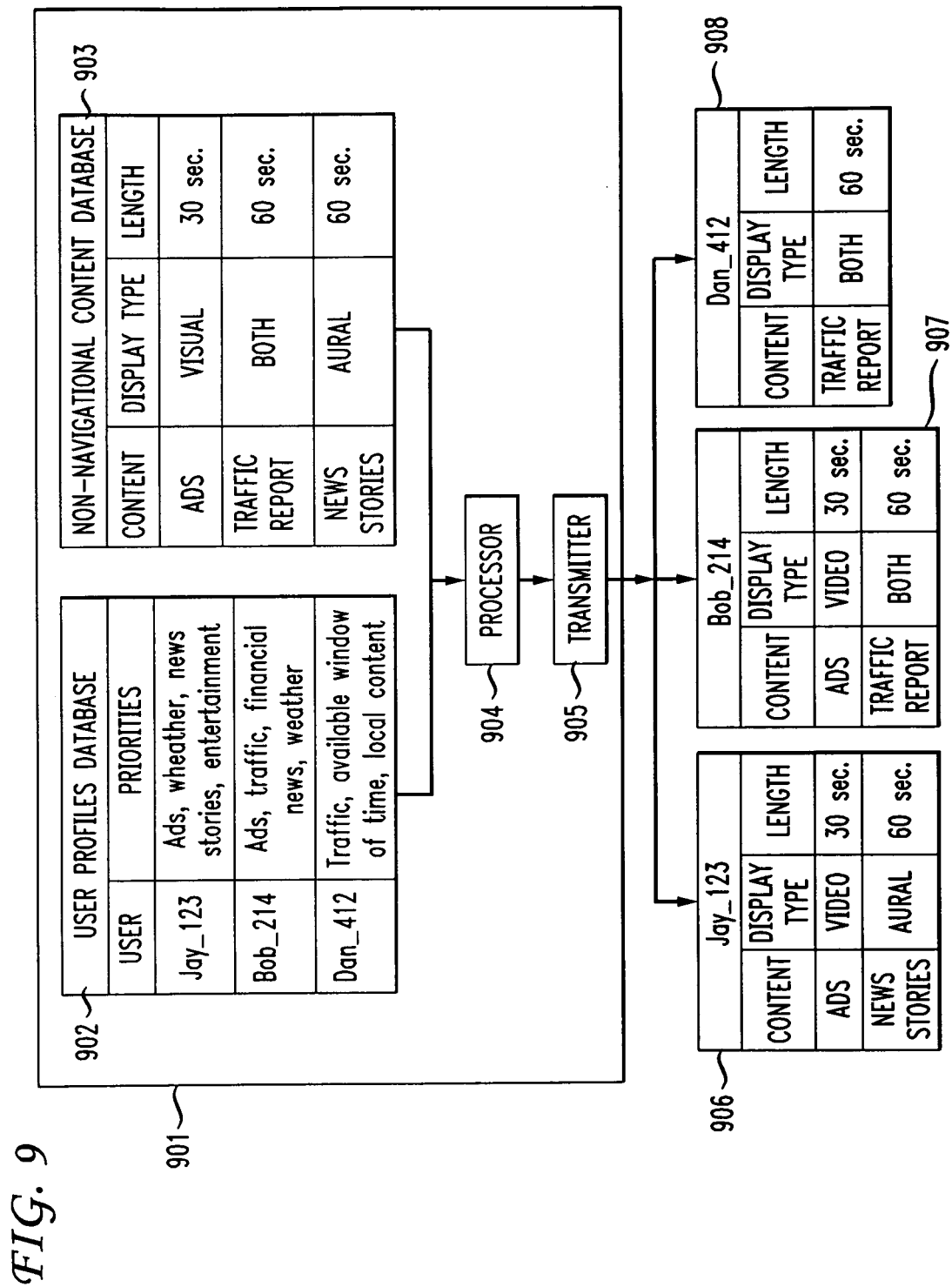
FIG. 9 is a block diagram illustrating an embodiment of a server device.

FIG. 9 is a block diagram illustrating an embodiment of a server device 901. A mobile user profile database 902 contains mobile users listed by "user names", such as Jay_123, Bob_214, and Dan_412. Associated with each user name are priorities. These priorities may have been selected by the mobile user. Alternatively, the priorities may reflect a factory setting.

A non-navigational content database, 903, contains various non-navigational contents which are available for transmission to the mobile user's device. Included in this database is the length of the content and the display type of the content—for example—visual, aural, or both.

A processor 904 in the server device uses databases 902 and 903 to identify non-navigational content for each mobile user. A transmitter 905 then transmits the identified content to a mobile user's device. The transmitter illustratively transmits the identified content over a cellular network.

FIG. 9 further shows three different navigational devices 906, 907 and 908 that have received non-navigational content transmitted from the server. In one example, the data received by each mobile user's device reflects the interests for that particular mobile user. In this embodiment, multiple pieces of non-navigational content may be stored in each mobile user's navigational device. During the available window of time for presenting non-navigational content, the selection of which content to present is determined by the mobile user's device.

Figure 10:
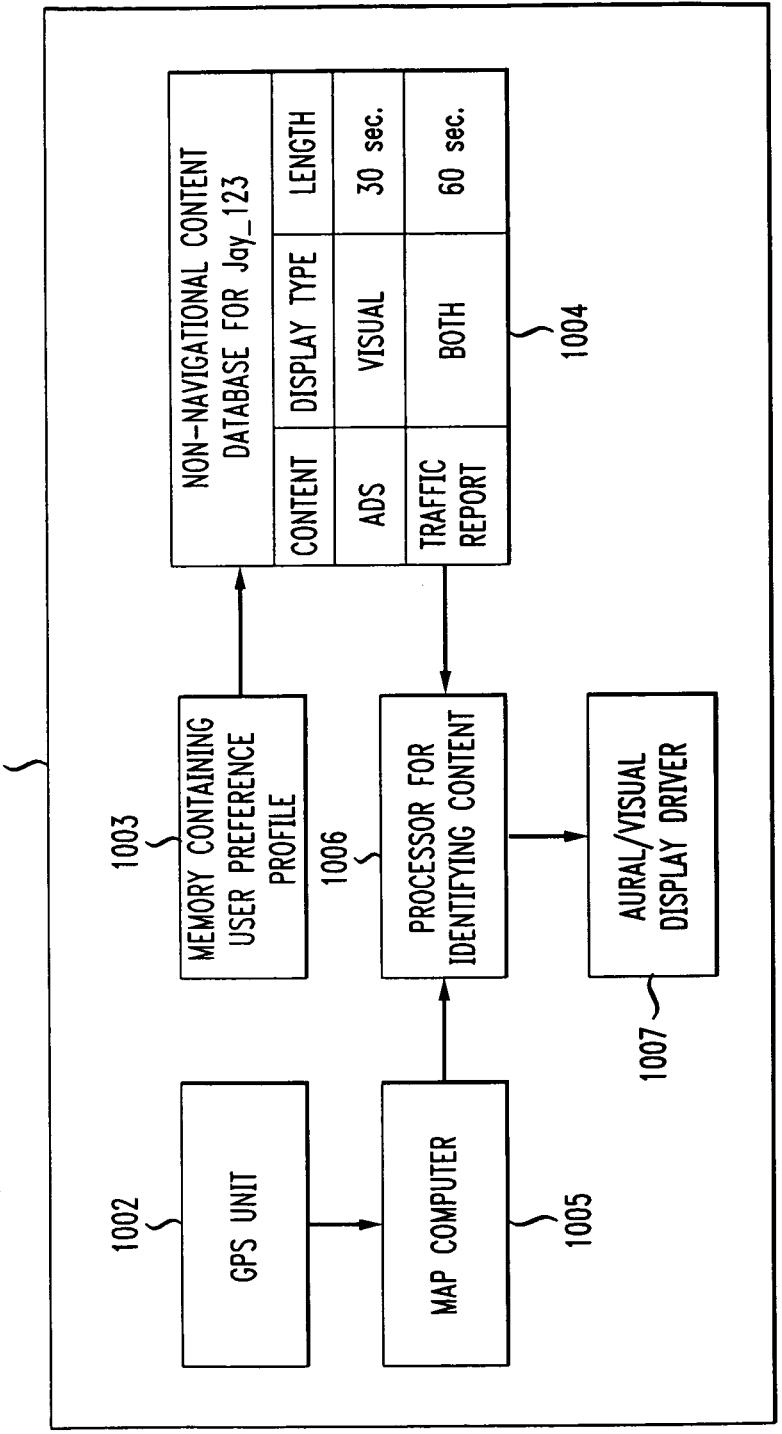
FIG. 10 is a block diagram illustrating an embodiment of a mobile user's device.

FIG. 10 is a block diagram illustrating an embodiment of a mobile user's device 1001. GPS unit 1002 determines the mobile user's location on a trip. This location is needed to know what navigational content to provide to the mobile user. In one embodiment, the mobile user's device serves as a navigational device for displaying navigational content. In another embodiment, the mobile user's device is in the same environment as a navigational device, but is not the actual device which is used to display a piece of navigational content.

The navigational content is illustratively stored in a map computer 1005. Alternatively, the navigational content may be stored on the server device and transmitted to the mobile user's device when the navigational content is needed.

A memory 1003 contains a mobile user preferences profile, and another memory 1004 contains a database of non-navigational content. Most non-navigational content may be stored on a server, and this memory 1004 is a more limited database for storing non-navigational content. Alternatively, memory 1004 may be a primary storage location for non-navigational content.

A processor, 1006, identifies which content to present to a mobile user. If there is navigational content that needs to be presented to a mobile user, then that content takes precedence. However, if there is a window of time available before this content needs to be presented, then non-navigational content of sufficiently short length may be presented.

The appropriate content—whether aural or visual or both—is displayed via an audio/visual display driver, 1007.

Figure 11:
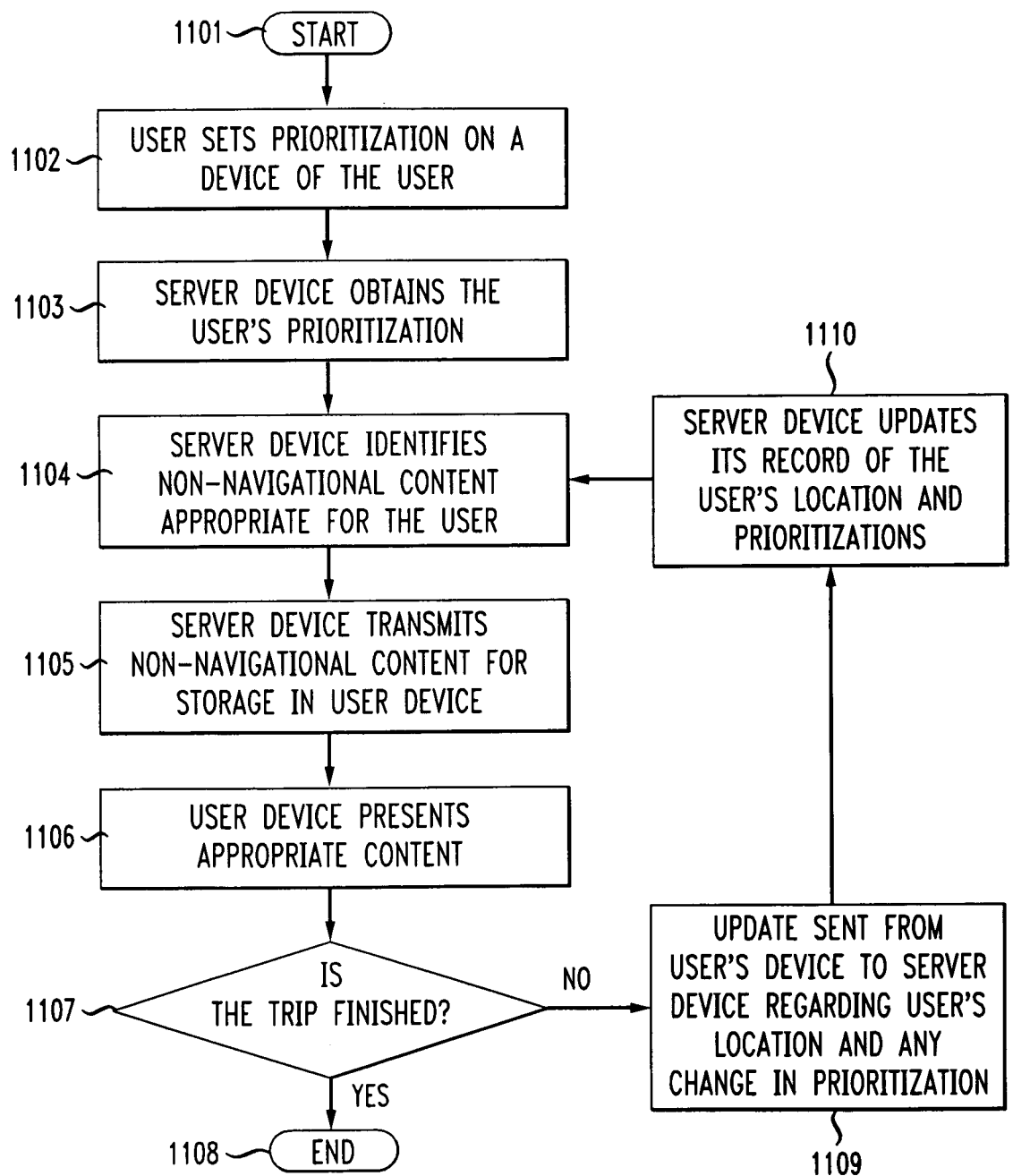
FIG. 11 is a flowchart illustrating an embodiment for carrying out the invention.

FIG. 11 is a flowchart illustrating an embodiment for carrying out the invention. The process starts at 1101.

At step 1102, a mobile user sets preferences on the mobile user's device. At step 1103, the mobile-user-specified preferences are obtained by a server device. At step 1104, a server device is utilized to identify non-navigational content which is appropriate for the mobile user. Once identified, this non-navigational content is transmitted to a mobile user's device, at step 1105. The transmitted content may be stored until it is displayed at a later available window of time; or, the step of transmitting may be done at the same time as the step of displaying, when an available time window exists.

At step 1106, the mobile user's device presents the appropriate content. This may be navigational content or non-navigational content, depending on the mobile user's location and the available window of time. Thus, in this embodiment, the mobile user's device is also a navigational device, i.e. a device able to display navigational content. At step 1107, it is determined if the trip is finished. If the trip is completed, then the method ends at step 1108.

If the trip is still in progress, then the method continues, at step 1109, with an update sent from the mobile user's device updating location and any changes in preferences to the server device. At step 1110, the server device updates preferences and location for mobile user's device. The method then continues at 1104, as is described above.

The embodiment shown in FIG. 11 illustrates one scenario where certain functions are performed by a server device and certain functions are performed by a mobile user's device. However, other scenarios are possible which also fall under the general principles of this invention. In some scenarios, the server device performs more of the steps of the invention. In other scenarios, the mobile user's device may perform more of the steps of the invention.

It will thus be appreciated that those skilled in the art will be able to devise numerous alternative arrangements that, while not shown or described herein, embody the principles of the invention and thus are within its spirit and scope.

The invention claimed is:

1. A method, comprising:
   receiving, by a mobile device equipped with a global positioning system, global positioning system information identifying a destination location;
   determining, by the mobile device, a path of travel to the destination location from a current location based on the global positioning system information;

computing, by the mobile device, a first location on the path of travel at which a first turn should be made in order for the mobile device to stay on the path of travel;

prior to the mobile device arriving at the first location, aurally presenting by the mobile device a first turn instruction that provides aural information about a distance to the first turn;

computing, by the mobile device, a second location on the path of travel at which a second turn should be made subsequent to the first turn in order for the mobile device to remain on the path of travel;

determining, by the mobile device, a travel distance between the first location and the second location based on the global positioning system information;

determining, by the mobile device, a speed of travel based on the global positioning system information;

computing, by the mobile device, a window of time between the first location and the second location based on the travel distance and the speed at which the mobile device travels;

querying, by the mobile device, a database stored in memory for the window of time, the database storing associations between different names of advertisements and different windows of time;

retrieving, by the mobile device, one of the different names of the advertisements that matches the window of time;

retrieving, by the mobile device, an electronic file associated with the one of the different names of the advertisements; and processing, by the mobile device, the electronic file for aural presentation during the window of time between the first location and the second location before aurally announcing the second turn.

2. The method of claim 1, further comprising mapping the path of travel.

3. The method of claim 2, further comprising generating an electronic map displaying the first location of the first turn.

4. The method of claim 3, further comprising displaying the second location of the second turn on the electronic map.

5. The method of claim 1, further comprising displaying the window of time on the electronic map before aural announcement of the second turn.

6. The method of claim 1, further comprising computing a remaining time in the window of time as the electronic file is aurally presented.

7. The method of claim 6, further comprising displaying the remaining time on the electronic map until the second turn is announced.

8. The method of claim 1, further comprising generating a graphical user interface.

9. The method of claim 1, further comprising acquiring the global positioning system information.

10. The method of claim 1, further comprising processing a preference that declines non-navigational content.

11. The method of claim 1, further comprising wirelessly receiving the electronic file over a wireless channel.

12. The method of claim 1, further comprising determining an expiration of the window of time.

13. The method of claim 1, further comprising projecting a time of the second location of the second turn based on the speed and the travel distance.

14. The method of claim 1, further comprising storing the electronic file in the memory of the mobile device.

15. The method of claim 1, further comprising processing a preference for non-navigational content.

16. The method of claim 1, further comprising determining multiple filenames are associated with the window of time in the database.

17. The method of claim 16, further comprising prioritizing the aural presentation of different files that correspond to the multiple filenames.

18. An apparatus, comprising:
a processor;
a global positioning system; and
a memory storing instructions that when executed cause the processor to perform operations, the operations comprising:
receiving entry of a destination location in a graphical user interface;
determining a path of travel from a current location to the destination location based on receipt of global positioning system information;
determining a first location along the path of travel at which a first navigational instruction should be aurally announced;
aurally announcing the first navigational instruction to maintain the path of travel;
determining a second location along the path of travel at which a second navigational instruction should be aurally announced;
determining a travel distance between the first location and the second location;
computing a window of time between the first location and the second location based on the travel distance and a speed of travel;
querying a database for the window of time, the database storing associations between different filenames of advertisements and different windows of time;
retrieving one of the different filenames of advertisements that is associated with the window of time between the first location and the second location;
retrieving a file associated with the one of the different filenames of advertisements; and
processing the file for aural presentation during the window of time between the first location and the second location, wherein the file is played in time for aurally announcing the second navigational instruction.

19. A system, comprising:
a processor; and
a global positioning system; and
a memory storing instructions that when executed cause the processor to perform operations, the operations comprising:
determining navigational instructions from a current location to a destination location based on global positioning system information;
determining a duration of time between aural announcements of a first navigational instruction and a successive second navigational instruction, based on a speed and a distance determined from the global positioning system information;
querying a database for the duration of time, the database having entries that associate different filenames of advertisements to different durations of time;
determining a match between the duration of time and one of the entries in the database;
retrieving a filename of an advertisement in response to the match;
retrieving a file associated with the filename of the advertisement; and processing the file for presentation such that the advertisement is presented during the duration of time before aural announcement of the successive second navigational instruction.

* * * * *